United States Patent
Brookey et al.

(10) Patent No.: US 6,257,678 B1
(45) Date of Patent: Jul. 10, 2001

(54) VEHICLE HUB HAVING REDUCED LUBRICANT CAVITY

(75) Inventors: Michael W. Brookey, New Carlisle; John C. Hall, Centerville, both of OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/401,752

(22) Filed: Sep. 23, 1999

(51) Int. Cl.$^7$ ...................................................... B60B 27/00
(52) U.S. Cl. ............................................................ 301/105.1
(58) Field of Search .................................. 301/105.1, 111, 301/124.1, 126, 131; 180/258, 259

(56) References Cited

U.S. PATENT DOCUMENTS

| | | | |
|---|---|---|---|
| 2,781,231 | * 2/1957 | Black | 301/105.1 |
| 4,699,433 | * 10/1987 | Kopp | 301/105.1 |
| 5,303,800 | 4/1994 | Persson . | |
| 5,328,275 | 7/1994 | Winn et al. . | |
| 5,560,687 | * 10/1996 | Hagelthorn | 301/124.1 X |

FOREIGN PATENT DOCUMENTS

| | | | |
|---|---|---|---|
| 3409837 | * 11/1984 | (DE) | 301/105.1 |
| 24559 | * 3/1981 | (EP) | 301/105.1 |

* cited by examiner

Primary Examiner—Russell D. Stormer
(74) Attorney, Agent, or Firm—Carlson, Gaskey & Olds, P.C.

(57) ABSTRACT

A vehicle hub includes a generally cylindrical axially extending body forming an inboard bearing seat, an outboard bearing seat and lubricant cavity therebetween. The hub is preferably cast as an integral component from a ductile iron. A plurality of integral open ribs connects the body to a radially extending flange. The ribs form an open area between the body and the ribs. The open structure of ribs providing increased cooling for the bearings and lubricant while decreasing weight without sacrificing hub strength and rigidity. The lubricant cavity is of a reduced diameter which reduces the volume of lubricating medium required to fill the cavity and minimizes the centrifuge effect acting upon the medium. The beneficial effects of the improved hub providing increased bearing cooling, lighter weight, a smaller lubricant cavity and increased strength.

13 Claims, 2 Drawing Sheets

VEHICLE HUB HAVING REDUCED LUBRICANT CAVITY

BACKGROUND OF THE INVENTION

The present invention relates to a vehicle hub, and more particularly to a vehicle hub having improved life and bearing cooling.

Typical vehicle hubs include mounting seats for inboard and outboard bearings. The bearings are fitted into the hub and allow the hub to rotate on the end of a relatively stationary axle assembly. To allow the hubs to rotate freely and to reduce heat caused by friction, the bearings must be lubricated. A lubricant chamber is therefore located in the hub intermediate the bearing seats to retain a lubricating medium such as grease. The hubs commonly provide rather large capacity lubricating chambers to retain a large volume of lubricating medium to provide long lasting performance.

As the lubricant chamber is increased, however, a larger quantity of lubricant is required to completely fill the lubricating cavity. Further, as the lubricant cavity is increased in diameter, the lubricating medium undergoes greater centrifugal force as the hub rotates about the axle. The lubricating medium is thrown away from the bearings, thus making proper lubrication more difficult. The reduced lubrication increases the effects of friction and heat possibly leading to a bearing failure. This centrifuge effect is a particular problem with viscous lubricating mediums such as synthetic grease.

Accordingly, it is desirable to provide an improved vehicle hub having improved bearing cooling and improved compatibility with synthetic grease.

SUMMARY OF THE INVENTION

The improved vehicle hub according to the present invention includes a generally cylindrical axially extending body having a centrally located opening formed therethrough. The body forms an inboard bearing seat, an outboard bearing seat and lubricant cavity therebetween. The hub further provides a plurality of integral open ribs which connect the body to a radially extending flange.

The ribs are formed such that an open area is formed between the body and the ribs. The open structure of the ribs provides increased cooling to the body. The bearing seats and therefore the bearings receive additional cooling through the open rib structure. Further, the open ribs provide the added benefit of decreasing the overall hub weight without sacrificing hub strength and rigidity.

The hub lubricant cavity is preferably of a reduced diameter that is less than the inboard and outboard bearing seat diameter. By decreasing the size of the lubricant cavity, the volume of lubricating medium required to fill the cavity is proportional decreased. Less lubricating medium is necessary to provide long lasting performance. Further, the reduced diameter of the lubricant cavity minimizes the centrifuge effect acting upon the medium. The bearings receive a more constant supply of lubricating medium which further increases the performance and longevity of the bearings.

The hub is preferably cast as an integral component from a ductile iron. Ductile iron facilitates a lightweight hub design while increasing heat transfer properties from similar iron hubs. Thus, additional heat is carried away from the bearings and lubricant. The beneficial effects of the improved hub according to the present invention include increased bearing cooling, lighter weight, a smaller lubricant cavity and increased strength.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
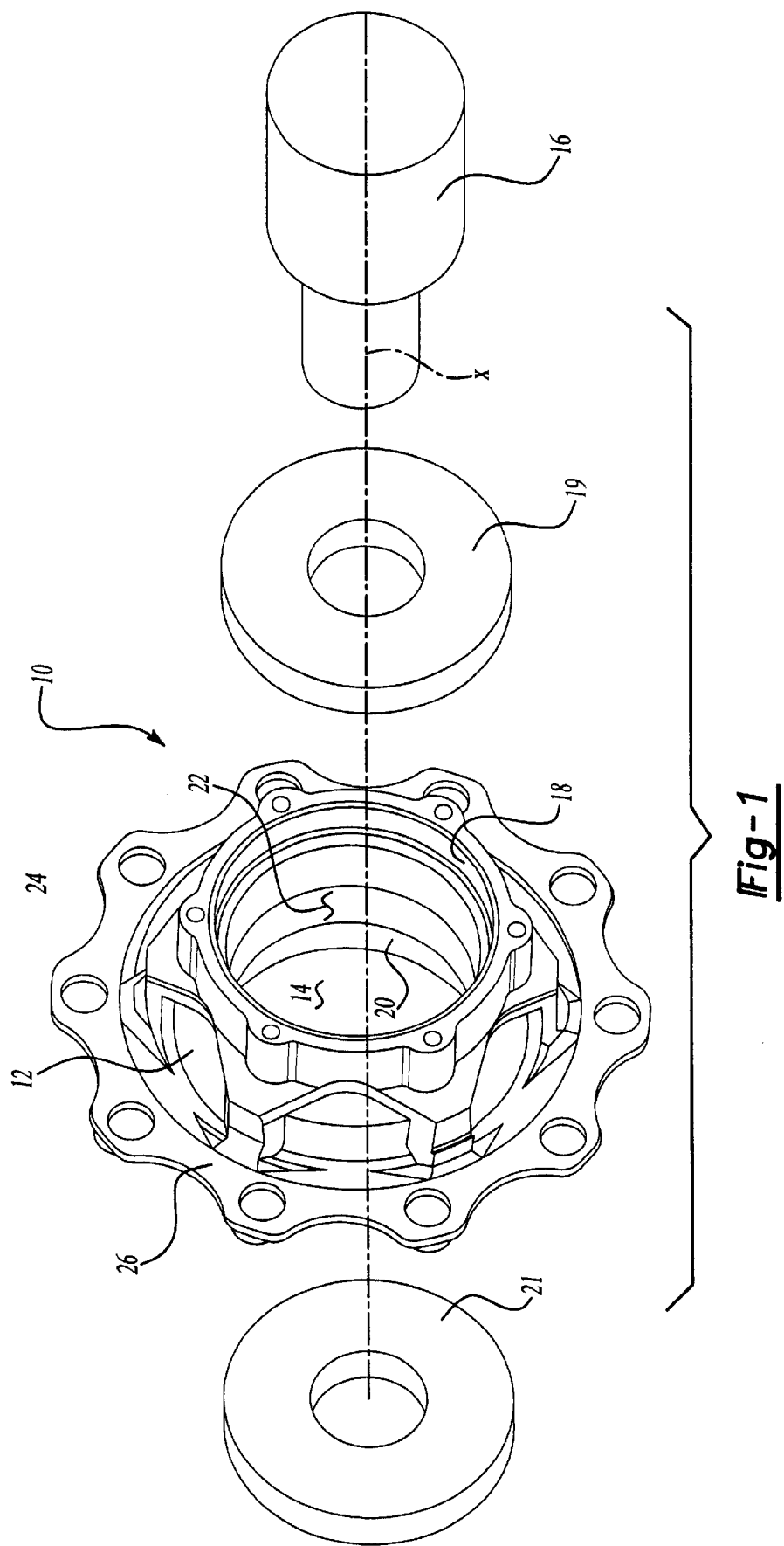
FIG. 1 is a general perspective view of a vehicle hub assembly according to the present invention.

FIG. 1 illustrates a vehicle hub 10 according to the present invention. The hub 10 includes a generally cylindrical axially extending body 12 defining a central axis of rotation X. A centrally located opening 14 formed therethrough receives an axle spindle (shown generally at 16.) The body 12 forms an inboard bearing seat 18, an outboard bearing seat 20 and lubricant cavity 22 therebetween. The inboard bearing seat 18 and the outboard bearing seat 20 respectively receive bearing assemblies 19 and 21. The body 12 further provides a plurality of integral open ribs 24 which connect the body 12 to a radially extending flange 26. Preferably, the body 12, ribs 24 and flange 26 are an integral one-piece cast metal.

Figure 2:
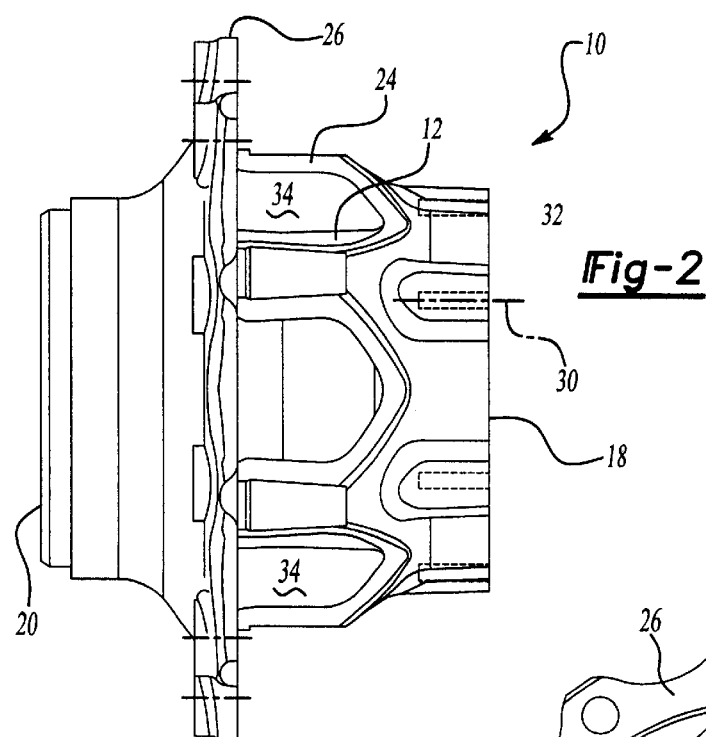
FIG. 2 is a side view of the vehicle hub of FIG. 1.
Figure 3:
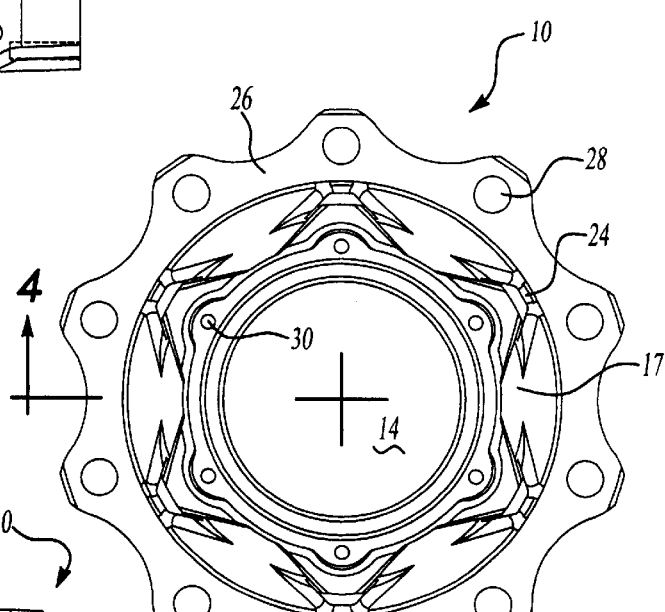
FIG. 3 is a front view of the vehicle hub of FIG. 1.

Referring now to the side view of FIG. 2, the open structure of the hub 10 is shown. The hub 10 is strengthened by a plurality of the integral open ribs 24 which are attached between the radially extending flange 26 and the body 12. As shown, the ribs 24 extend from an inboard portion 32 of the body 12 and attach to the flange 26. The ribs 24 are formed such that an open area 34 is formed between the body 12 and the ribs 24. The open areas around ribs 24 provides increased cooling for the body 12. As shown in FIG. 3, the radially extending flange 26 projects from the body 12 and includes a plurality of mounting apertures 28 for receipt of fasteners (not shown) to mount the hub 10 to a wheel rim (not shown). The hub 10 also includes a plurality of apertures 30 formed in the body 12. The apertures 30 are adapted to receive fasteners (not shown) to secure a hub cap (not shown).

Figure 4:
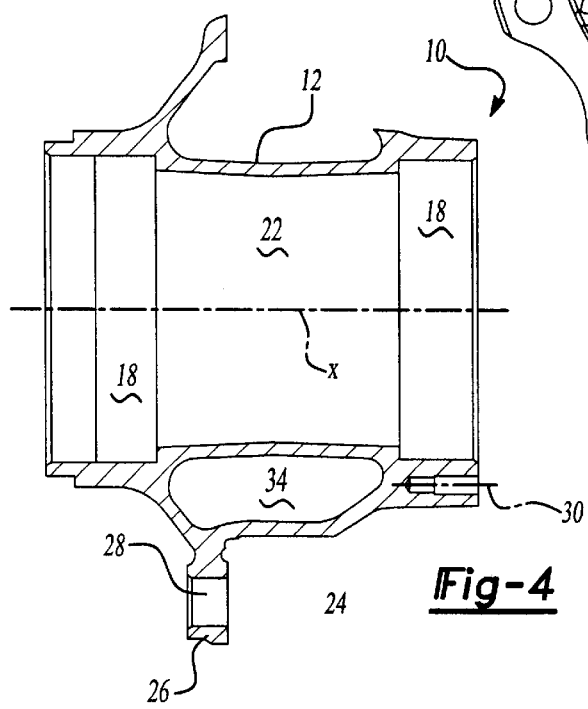
FIG. 4 is a sectional view of the vehicle hub taken along the line IV—IV of FIG. 3.

The open structure of the hub 10 is clearly shown in the sectional view of FIG. 4. Open area 34 is defined between the body 12 and the ribs 24. The ribs 24 define a bridge over the open area 34 to provide a direct cooling path to the body 12. The top part of FIG. 4 illustrates an area intermediate the ribs 24. It is to be understood that although six ribs 24 are shown in the disclosed embodiment any number and relationship is likewise contemplated by the present invention.

As the ribs 24 are open or spaced from body 12 structure, a greater area of the body 12 is exposed. The inboard bearing seat 18, outboard bearing seat 20 and the lubricant cavity 22 receive increased cooling than if the ribs 24 were solid. Further, the open ribs 24 provide the added benefit of decreasing the overall hub weight without sacrificing hub strength and rigidity.

The open ribs 24 preferably span the axial length of lubricant cavity 22. The body 12 provides the greatest exposed area to the environment. Preferably, the lubricant cavity 22 is of a diameter less than the inboard 18 and outboard 20 bearing seat diameter. By decreasing the size of the lubricant cavity 22, the volume of lubricating medium required to fill the cavity is proportional decreased. Less lubricating medium is thus necessary to provide long lasting performance. Further, the reduced diameter of the lubricant cavity 22 minimizes the centrifuge effect acting upon the medium. The bearings receiving a more constant supply of lubricating medium which further increases bearing performance and longevity. This is particularly advantageous for use with synthetic grease which typically have a higher viscosity and are more susceptible to heat.

The hub 10 is preferably cast as an integral component from a ductile iron. Ductile iron further decreases the hub weight while increasing heat transfer properties. Thus, additional heat is carried away from the bearings and lubricant without increasing weight. These beneficial effects provide an improved hub 10 having increased bearing cooling, lighter weight, a smaller lubricant cavity and increased strength.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle hub comprising:
   a hub body having a centrally located through opening which defines an axis of rotation, said hub body including an inboard bearing seat, an outboard bearing seat, and an intermediate lubricant cavity;
   a flange extending radially from said hub body; and
   at least one axially extending rib attached to said hub body at a first location, said at least one axially extending rib extending to said flange and spaced from said hub body between said said first location and said flange.

2. The vehicle hub as recited in claim 1, wherein said rib is integral to said hub body and said flange.

3. The vehicle hub as recited in claim 1, wherein said rib spans said lubricant cavity.

4. The vehicle hub as recited in claim 1, wherein said rib defines an open area between said hub body and said open rib.

5. The vehicle hub as recited in claim 1, wherein said hub is manufactured from a ductile iron.

6. The vehicle hub as recited in claim 1, wherein said hub is cast as one-piece.

7. The vehicle hub as recited in claim 1, wherein said lubricant cavity defines a diameter less than said inboard bearing seat and said outboard bearing seat diameter.

8. A vehicle hub comprising:
   a hub body having a centrally located through opening which defines an axis of rotation, said hub body including an inboard bearing seat, an outboard bearing seat, and an intermediate lubricant cavity, said lubricant cavity defining a diameter less than said inboard bearing seat and said outboard bearing seat diameter;
   a flange extending radially from said hub body; and
   an axially extending rib attached to said hub body, at least a portion of said axially extending rib being spaced away from said hub body.

9. The vehicle hub as recited in claim 8, wherein said rib is integral to said hub body and said flange.

10. The vehicle hub as recited in claim 8, wherein said rib defines an open area between said hub body and said open rib.

11. The vehicle hub as recited in claim 8, wherein said hub is manufactured from a ductile iron.

12. A one-piece vehicle hub comprising:
    a hub body having a centrally located through opening which defines an axis of rotation, said hub body including an inboard bearing seat, an outboard bearing seat, and an intermediate lubricant cavity, said lubricant cavity defining a diameter less than said inboard bearing seat and said outboard bearing seat diameter;
    a flange extending radially from said hub body; and
    an axially extending open rib integrally attached to said hub body and said flange said axially extending open rib defining an open area between said hub body and said open rib.

13. The vehicle hub as recited in claim 12, wherein said hub is manufactured from a ductile iron.

* * * * *